Figure 1:
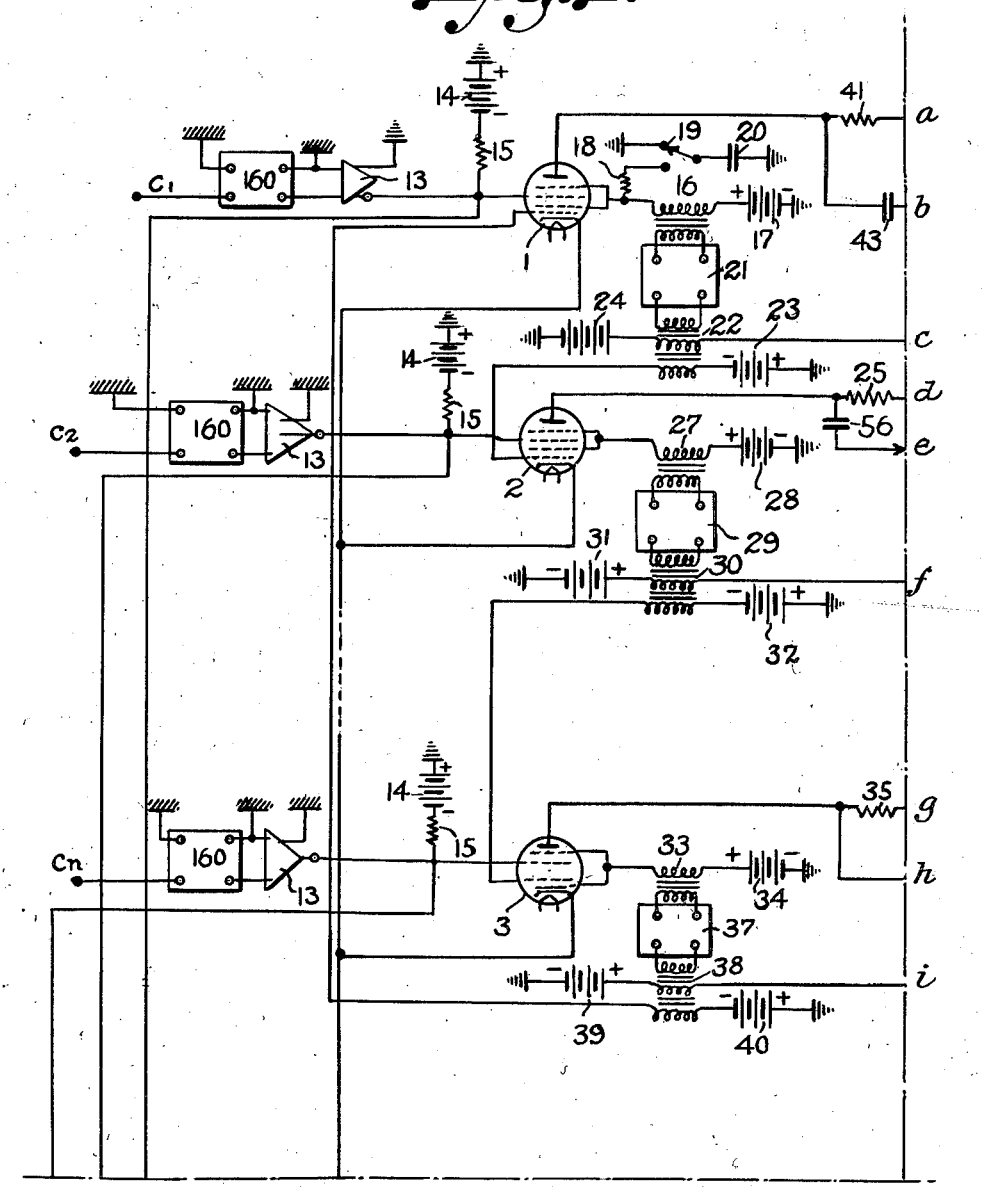

Dec. 3, 1957     R. F. J. FILIPOWSKY     2,815,448
AUTOMATIC AUCTION CIRCUIT

Filed May 16, 1956     4 Sheets-Sheet 1

INVENTOR.
Richard Friedrich Josef Filipowsky,
BY
Wenderoth, Lind & Ponack
ATTYS.

Dec. 3, 1957
R. F. J. FILIPOWSKY
2,815,448
AUTOMATIC AUCTION CIRCUIT
Filed May 16, 1956
4 Sheets-Sheet 2
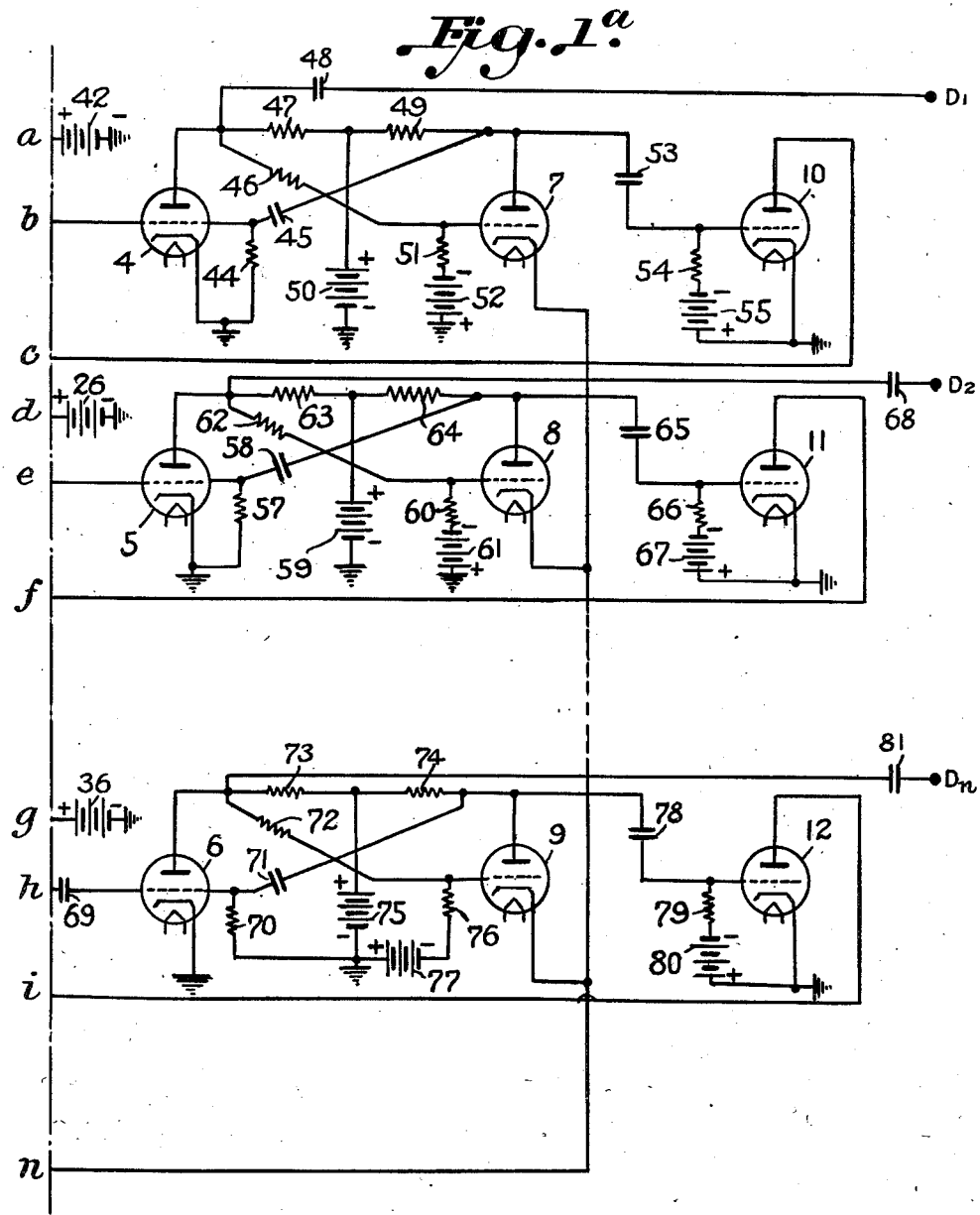
Fig. 1ᵃ
INVENTOR.
Richard Friedrich Josef Filipowsky,
BY
Wenderoth, Lind & Ponack
ATTYS.

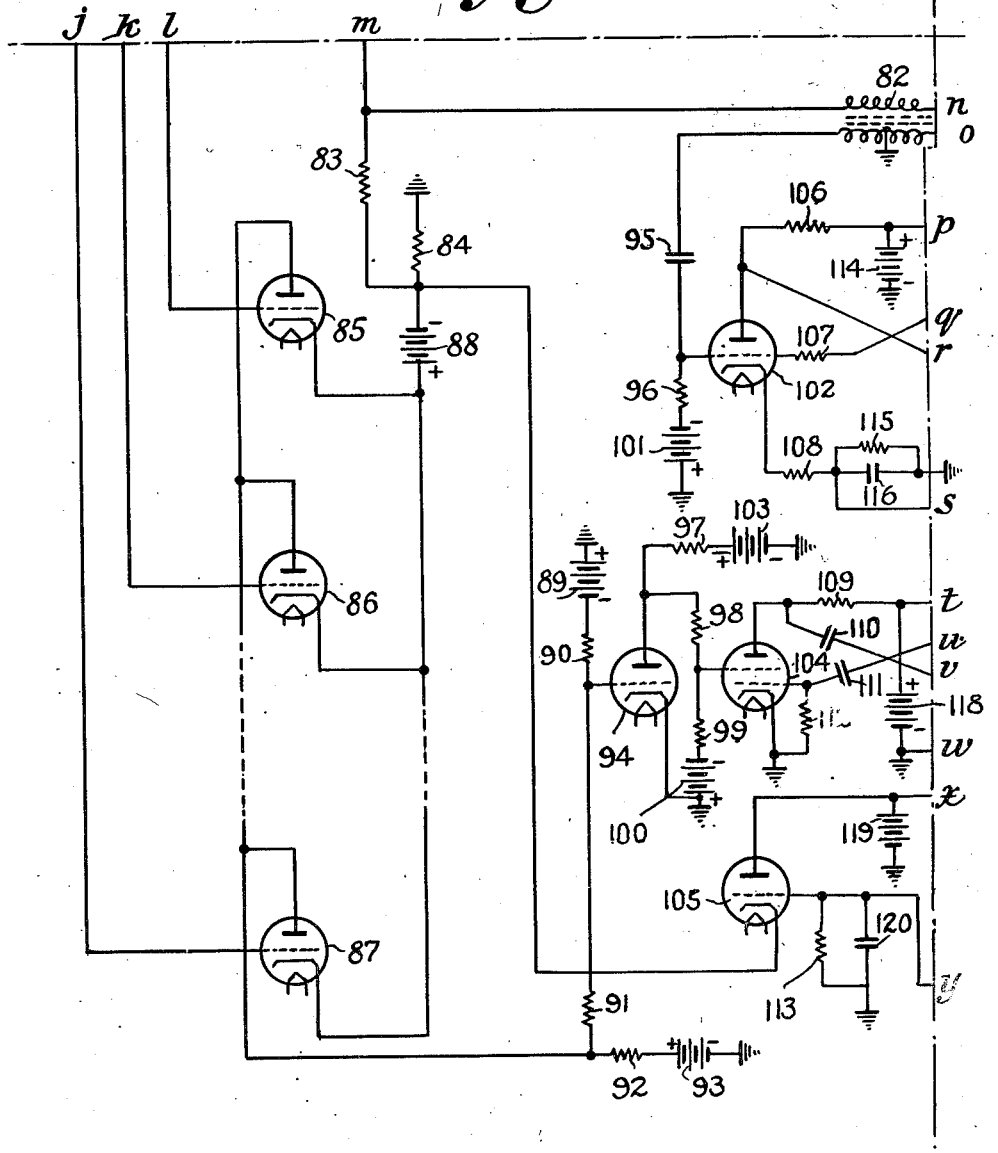

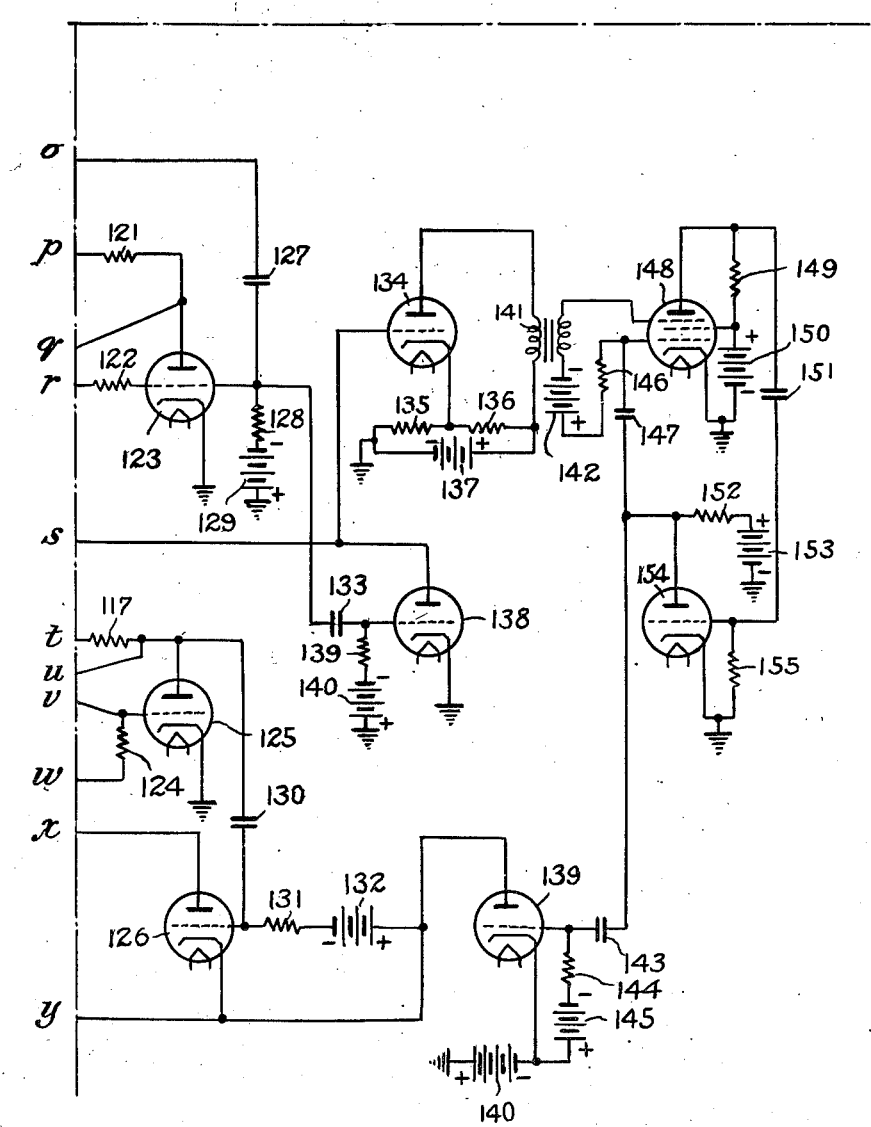

United States Patent Office 2,815,448
Patented Dec. 3, 1957

2,815,448
AUTOMATIC AUCTION CIRCUIT

Richard Friedrich Josef Filipowsky, Glen Burnie, Md., assignor to Companhia Portuguesa Radio Marconi, S. A. R. L., Lisbon, Portugal Application May 16, 1956, Serial No. 585,238

Claims priority, application Portugal June 20, 1955

3 Claims. (Cl. 250—27)

The present invention relates to an electronic circuit which is in a position to indicate the one channel, out of a number of input channels, which has at a given instant the highest value of a given physical magnitude. The indications can follow each other with any arbitrarily small time delay, which is merely determined by the given delay times of the electronic circuits involved. The indications are available in the form of trigger pulses at any one of the $n$ outputs, whenever $n$-channels have to compared.

The input signals to be compared should be available in the form of sufficiently high voltages, preferably in quantised form. As in this case the circuit is the exact model of a commercial auction, where every participant bids in multiples of a given currency unit, the system has been named tentatively: Automatic Auction Circuit (AAC).

It has a wide range of applications in computors, atomic counting and measuring devices, industrial electronics (to assort any samples of different sizes, colors, weight, etc.), in actual auctions, and similar practical applications and last but not least in asynchronous multi-channel pulse communication systems, to determine the priority with which a certain chanel requires to be sampled.

The circuit consists of two main parts. One electronic ring circuit to scan all participating channels with high speed and one variable limiter device, which has to change a blocking voltage which normally prevents any input signal from reaching any one of the $n$ outputs.

When starting from rest position, this blocking voltage is highest. No ouput can be triggered. The ring circuit starts scanning all circuits and cannot find a single channel which indicates a higher input than this maximum blocking voltage. After each fruitless scanning cycle of the ring circuit, the blocking voltage is reduced for one given voltage quantum, until the first and usually highest "bidder" input signal becomes larger than this variable limit (blocking voltage). A trigger pulse is now produced in the output of this channel. In particular applications it may be advisable to use this trigger also to suppress the input signal of this channel for some time. The circuit indicates then automatically at the next cycle of the ring circuit the second highest bidder and so on.

If the highest bidder however is not suppressed this output will now get repeated trigger pulses until another channel excels this bidder. An additional circuit raises the said blocking voltage whenever two or more bidders develop higher voltages than the limit. For the case of exactly equal biddings normally the first of the equal bidders in the given sequence of the ring circuit will be indicated first, but simultaneous indications of both of them is possible or is automatically secured, whenever the circulation period of the ring circuit is made much smaller than the bidding time.

With the above and other objects in view which will appear from the description below, the details of the circuit are disclosed in the drawings, in which:

Fig. 1 is a diagrammatic view of a portion of the circuit,

Fig. 1a is a similar view to the right of Fig. 1 showing the connections thereto at connections $a, b, c, d, e, f, g, h$ and $i$ and the connection $n$ to Fig. 1b, Fig. 1b is a similar view to the bottom of Fig. 1 showing the connections thereto at connections $j, k, l$ and $m$ and the connection $n$ to Fig. 1a, and Fig. 1c is a similar view to the right of Fig. 1b showing the connections thereto at connections $o, p, q, r, s, t, u, v, w, x$ and $y$.

The upper part demonstrates the ring circuit for scanning all input channels as it has been previously described in my U. S. Patent No. 2,676,202 granted April 20, 1954. The tubes 1, 2, . . . 3 are switching tubes (hexodes) with two control-grids. Both these grids are biased beyond cutoff by the batteries 14 and 40, 23, 32 respectively. The inputs $C_1, C_2, \ldots C_n$ are connected over D. C. amplifiers 13 (if required) to the third grids (second control grids) of the tubes 1, 2, . . . 3. The outputs (plates) of the tubes 1, 2, . . . 3 are connected over resistors 41, 25, 35 to B-supply devices 42, 26, 36. Pulses can appear in these plate circuits only, if both control electrodes of the tubes 1, 2, . . . 3 are made simultaneously active. The first grid (control electrode) of the tubes 1, 2, . . . 3 are connected to one secondary winding of the transformers 38, 22, . . . 30. These transformers receive primary pulses either over the delay circuits 37, 21, . . . 29 or from the buffer stages 12, 10 . . . 11 (Fig. 1a).

Assume that all channels have a low input voltage. All tubes will then remain blocked on both their control electrodes. We may now start a single pulse by putting the switch 19 to its lower position, thus producing a pulsive current through the primary winding of the transformer 16. This pulse is delayed for a small amount in the delay network 21 and appears thereafter as positive opening pulse at the first grid of tube 2. It causes a pulse in the screen grid circuit of this tube, which is again forwarded over 27, 29 and 30 to the first grid of the next tube until finally a pulse arrives over tube 3, transformer 33, delay network 37 and transformer 38, at the first grid of tube 1, closing the ring circuit. Such a gating pulse will continue to circulate in the ring circuit with a circulation time equal to the sum of the delay times of all the delay networks.

The situation changes as soon as one of the input circuits produces over the D. C. amplifiers 13 at one of the third grids of the tubes 1, 2, . . . 3 a voltage which is sufficiently high to open this tube, i. e. to cause a plate current in this tube, as soon as the first grid will be simultaneously active. It is under this condition only that the concerned multivibrator 4, 7 or 5, 8 . . . or 6, 9 will be placed into its unstable state, making either of the tubes 7, 8 . . . 9 conductive for a short period, determined by the concerned time constant 44, 45 or 57, 58 . . . or 70, 71. At the same time there will be a positive pulse at the common cathode resistor 83 plus 84, thus blocking all the tubes 1, 2 . . . 3 and preventing the continuation of the scanning pulse of the ring circuit. After said short period the concerned multivibrator will fall back to its stable state, the positive cathode pulse at 83 plus 84 will cease and another short pulse will be produced over the concerned differentiating RC element 53, 54 or 65, 66 . . . or 78, 79 and the concerned tube 10, 11 or . . . 12 through the central winding of the concerned transformer 22, 30 or . . . 38. This pulse will continue as the next gating pulse, circulating in the ring circuit and scanning all the channels. The pulse produced in the above mentioned manner in one of the monostable multivibrators will also appear in the concerned output D1, D2 . . . D$n$ as a signal indicating the channel which has been selected by the scanning ring circuit.

The lower part of the circuit shown in Figs. 1b and 1c carrying the components 82 to 155, constitutes the automatic auction circuit proper. Its purpose is to lower or to increase the level of the threshold, beyond which the scanning gating pulse can be stopped, in such a manner that only the channel with the highest instantaneous input voltage can actuate the device. This is done by a variable voltage drop produced across the common cathode resistor 84 primarily by the cathode current of tube 105. The buffer stages 85, 86, 87 draw plate current only whenever one or more of the input circuits have sufficiently high voltage to excel said threshold of the ring circuit, which is determined primarily by the batteries 14 in combination with the cathode current of tube 105 over the cathode resistor 84, more than a given small amount. This operation of the buffer stages 85, 86 . . . 87 is secured by connecting their control grids directly to the second control grids of the respective input stages and by inserting a small positive cathode bias 88 into the separate cathode branch of these tubes only. By this measure they will not be actuated as long as one or more inputs are only slightly higher than the threshold for actuating the ring circuit. But as soon as one or more input voltages excel this threshold for more than the value of the cathode bias, the buffer stages will operate. Operation of the buffer stages, i. e. plate current through plate resistor 92, will immediately lower the potential at the junction of 91 and 92 and therefore also at the grid of tube 94. Over the D. C. amplifier 94 the screen grid of tube 104 will become more positive and will finally allow the operation of the astable multivibrator 104, 125.

The center of the auction circuit is the storage capacitor 120 which determines the grid potential of the tube 105, which in turn determines the potential across the cathode resistor 84, the latter however is the potential of said variable threshold.

This capacitor 120 may be charged towards a higher positive potential by tube 126, whenever the multivibrator 104, 125 is operating.

This occurs whenever the buffer tubes draw plate current.

As may be seen, this action causes the threshold to be raised. The capacitor 120 may be discharged by the plate current of tube 139, whenever this tube is opened by the action of the astable multivibrator 148, 154. This has to be done whenever the threshold is too high. An indication for this condition may be found in the fact that the gating pulse of the ring circuit has performed a full cycle without finding a channel excelling the threshold; to indicate this condition, we use the differentiating transformer 82 with balanced secondary winding in cooperation with the bistable multivibrator 102, 123. Whenever one of the input channels excels the threshold, one of the multivibrators in the ring circuits will operate and a cathode pulse will pass through the primary winding of transformer 82. This pulse will be differentiated by the transformer 82, with such a polarity that its leading edge will push the multivibrator to a position in which tube 123 is conducting, and tube 102 is blocked. Over the differentiating capacitor 133 tube 138 is opened for a short time, whereby the plate current of this tube discharges capacitor 116 to a small positive potential.

The trailing edge of the pulse passing through the primary winding of transformer 82 causes the multivibrator to fall into its second stable position, with tube 102 conducting and tube 123 being blocked. Capacitor 116 is now gradually charged over the high resistor 108 and tube 102. Its increasing positive potential must reach, after a time equal to one circulation time of the gating pulse within the ring circuit, the opening potential of tube 134. The latter can be adjusted by resistors 135 and 136. If there is a pulse through the primary winding through transformer 82 prior to this instant, tube 138 will discharge capacitor 116 before it can reach the opening potential of tube 134. If however no further pulse has passed the primary winding of transformer 82 within this time interval, capacitor 116 will continue to be charged and tube 134 will produce a pulse over transformer 141, which should open the multivibrator 148, 154. In particular applications it might be preferable to replace this transformer by a further D. C. amplifier stage. The multivibrator 148, 154 produces regular pulses, which in turn cause tube 139 to send discharging pulses into the capacitor 120, thus lowering said threshold step by step until the first channel excels the threshold. In this moment a pulse will pass the primary of transformer 82 and its leading edge will stop the multivibrator by means of tube 138, as explained above.

This "elastic" operation of the threshold of the ring circuit can still be improved, when the input signals are quantised and when the steps for which the threshold is altered, correspond to the height of one quantum of the input signals, when acting at the second control grids of tubes 1, 2 . . . 3.

Such improvement can be easily achieved by inserting a quantization circuit 160 into the connecting lead to amplifiers 13 into each channel. Such quantization circuits are well known parts of PCM (pulse code modulation) modulators.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An electronic switching circuit to designate instantaneously one input channel or line out of a number of inputs which indicates the highest instantaneous signal value, comprising an input stage for each channel having two activating electrodes arranged in series connection, connecting means to connect each channel input to the second of said activating electrodes, comprising for each channel a monostable pulse generator which is actuated by the output of said input stage, a delay network which receives a pulse in its input whenever the first of said two activating electrodes is operating and which forwards the pulse after a given delay to said first activating electrode of the input stage of the next channel in a given sequence, a tube for each channel acting as a buffer stage having a control grid connected to the second activating electrode of the corresponding input stage, a common cathode battery for said buffer tubes, connecting leads to interconnect all cathodes of said buffer stages and to connect them to the positive terminal of said common cathode battery, a common cathode resistor for said buffer stages having one terminal ground connected, the negative terminal of said battery being connected to the other terminal of said common cathode resistor, a second cathode resistor having one terminal connected to the cathodes of all of said input stages and its other terminal connected to the non-grounded terminal of said first common cathode resistor, leads connecting the output of all of said monostable pulse generators over a common primary winding of a differentiating transformer to the cathodes of said input stages, a storage device common to all channels preferably a capacitor, which is connected to the grid of a tube the cathode of which is connected to the nongrounded terminal of said first common cathode resistor, a charging tube connected with its cathode to said storage device, a discharging tube connected with its anode to said storage device, an a-stable pulse generator, which actuates said charging tube whenever the sum of the plate currents of said buffer stages is too high, and a second a-stable pulse generator which actuates said discharging tube whenever the pulses through the primary winding of said differentiating transformer follow each other with a time delay larger than a given minimum time interval.

2. An electronic switching circuit as claimed in claim 1, comprising a quantization circuit in each channel preceding said input stage of each channel.

3. An electronic switching circuit to designate instantaneously one input channel or line out of a number of inputs which indicates the highest instantaneous signal value, comprising an input stage for each channel having two activating grids arranged in series connection, connecting means to connect each channel input to the second of said activating grids, comprising for each channel a monostable pulse generator which is actuated by the output of said input stage, a delay network which receives a pulse in its input whenever the first of said two activating grids is operating and which forwards the pulse after a given delay to said first activating grid of the input stage of the next channel in a given sequence, a tube for each channel acting as a buffer stage having a control grid connected to the second activating grid of the corresponding input stage, a common cathode battery for said buffer tubes, connecting leads to interconnect all cathodes of said buffer stages and to connect them to the positive terminal of said common cathode battery, a common cathode resistor for said buffer stages having one terminal ground connected, the negative terminal of said battery being connected to the other terminal of said common cathode resistor, a second cathode resistor having one terminal connected to the cathodes of all of said input stages and its other terminal connected to the non-grounded terminal of said first common cathode resistor, leads connecting the output of all of said monostable pulse generators over a common primary winding of a differentiating transformer to the cathodes of said input stages, a storage device common to all channels preferably a capacitor, which is connected to the grid of a tube the cathode of which is connected to the non-grounded terminal of said first common cathode resistor, a charging tube connected with its cathode to said storage device, a discharging tube connected with its anode to said storage device, an a-stable pulse generator, which actuates said charging tube whenever the sum of the plate currents of said buffer stages is too high, and a second a-stable pulse generator which actuates said discharging tube whenever the pulses through the primary winding of said differentiating transformer follow each other with a time delay larger than a given minimum time interval.

References Cited in the file of this patent

UNITED STATES PATENTS 2,642,527     Kelley  ---------------- June 16, 1953